US011755316B2

(12) United States Patent
Cook et al.

(10) Patent No.: US 11,755,316 B2
(45) Date of Patent: Sep. 12, 2023

(54) CUSTOMIZABLE CLOUD-BASED SOFTWARE PLATFORM

(71) Applicant: Twilio Inc., San Francisco, CA (US)

(72) Inventors: Al Cook, San Francisco, CA (US); Martin Amps, San Francisco, CA (US); Madis Abel, Tallinn (EE); Hando Tint, Tartu (EE); Tatjana Mihnovits, Hove (GB)

(73) Assignee: Twilio Inc., San Francisco, CA (US)

( * ) Notice: Subject to any disclaimer, the term of this patent is extended or adjusted under 35 U.S.C. 154(b) by 241 days.

(21) Appl. No.: 17/359,917

(22) Filed: Jun. 28, 2021

(65) Prior Publication Data
US 2021/0326129 A1    Oct. 21, 2021

Related U.S. Application Data

(63) Continuation of application No. 16/351,063, filed on Mar. 12, 2019, now Pat. No. 11,138,001.
(Continued)

(51) Int. Cl.
*G06F 8/71*     (2018.01)
*G06F 8/36*     (2018.01)
(Continued)

(52) U.S. Cl.
CPC ............... *G06F 8/71* (2013.01); *G06F 8/36* (2013.01); *G06F 8/65* (2013.01); *G06F 9/44526* (2013.01);
(Continued)

(58) Field of Classification Search
CPC .......... G06F 8/71; G06F 8/36; G06F 9/44526; H04L 63/08
See application file for complete search history.

(56) References Cited

U.S. PATENT DOCUMENTS 9,026,991 B2    5/2015  Ross
9,632,765 B1    4/2017  Falcone et al.
(Continued)

FOREIGN PATENT DOCUMENTS

IN    202017038353 A    10/2020
WO    WO-2019178130 A1    9/2019

OTHER PUBLICATIONS

"U.S. Appl. No. 16/351,063, Examiner Interview Summary dated Jan. 26, 2021", 2 pgs.
(Continued)

*Primary Examiner* — Minh Chau Nguyen
(74) *Attorney, Agent, or Firm* — Schwegman Lundberg & Woessner, P.A.

(57) ABSTRACT

Disclosed are systems, methods, and non-transitory computer-readable media for a customizable cloud-based software platform. A customizable cloud-based software platform provides functionality that enables a user (e.g., individual user, organization, etc., that has created an account with the customizable cloud-based software platform) to modify a base version of a cloud-based software application to the specific user's needs. For example, the customizable cloud-based software platform provides a base version of a cloud-based software application that includes a base set of functionalities, settings, user interfaces, etc., which a user may modify to meet the user's specific needs. A user may therefore use a client device to interact with the customizable cloud-based software platform to access their customized instance of the cloud-based application.

20 Claims, 10 Drawing Sheets

Related U.S. Application Data

(60) Provisional application No. 62/746,289, filed on Oct. 16, 2018, provisional application No. 62/641,539, filed on Mar. 12, 2018.

(51) Int. Cl.
*G06F 9/445* (2018.01)
*H04L 9/40* (2022.01)
*G06F 21/62* (2013.01)
*G06F 8/65* (2018.01)
*H04L 67/10* (2022.01)

(52) U.S. Cl.
CPC ............ *G06F 21/629* (2013.01); *H04L 63/08* (2013.01); *H04L 67/10* (2013.01)

(56) References Cited

U.S. PATENT DOCUMENTS

| | | | |
|---|---|---|---|
| 11,138,001 | B2 | 10/2021 | Cook et al. |
| 2003/0050913 | A1 | 3/2003 | Gershfield et al. |
| 2004/0148516 | A1* | 7/2004 | Tohgi ................ G06F 21/10 713/193 |
| 2012/0011496 | A1* | 1/2012 | Shimamura ......... G06F 9/44536 717/170 |
| 2012/0089562 | A1* | 4/2012 | Deremigio ............ G06F 16/254 707/703 |
| 2012/0131062 | A1 | 5/2012 | Kaisermayr |
| 2013/0185362 | A1 | 7/2013 | Clagg et al. |
| 2015/0242510 | A1 | 8/2015 | Shapira |
| 2015/0378715 | A1* | 12/2015 | Solnit .................... G08B 17/10 713/2 |
| 2016/0234186 | A1 | 8/2016 | Leblond et al. |
| 2016/0371071 | A1 | 12/2016 | Reese |
| 2018/0013637 | A1 | 1/2018 | Sanders et al. |
| 2018/0167490 | A1 | 6/2018 | Morton et al. |
| 2019/0097825 | A1 | 3/2019 | Kan et al. |
| 2019/0140894 | A1 | 5/2019 | Gujarathi et al. |
| 2019/0251278 | A1 | 8/2019 | Kalinichenko et al. |
| 2019/0278589 | A1 | 9/2019 | Cook et al. |

OTHER PUBLICATIONS

"U.S. Appl. No. 16/351,063, Examiner Interview Summary dated Jul. 20, 2020", 3 pgs.
"U.S. Appl. No. 16/351,063, Final Office Action dated Oct. 1, 2020", 16 pgs.
"U.S. Appl. No. 16/351,063, Non Final Office Action dated Mar. 3, 2021", 16 pgs.
"U.S. Appl. No. 16/351,063, Non Final Office Action dated Apr. 16, 2020", 14 pgs.
"U.S. Appl. No. 16/351,063, Notice of Allowance dated May 28, 2021", 9 pgs.
"U.S. Appl. No. 16/351,063, Response filed May 7, 2021 to Non Final Office Action dated Mar. 3, 2021", 11 pgs.
"U.S. Appl. No. 16/351,063, Response filed Jul. 14, 2020 to Non Final Office Action dated Apr. 16, 2020", 12 pgs.
"U.S. Appl. No. 16/351,063, Response filed Dec. 31, 2020 to Final Office Action dated Oct. 1, 2020", 12 pgs.
"Australian Application Serial No. 2019234671, First Examination Report dated Mar. 29, 2021", 4 pgs.
"European Application Serial No. 19713332.5, Response to Communication pursuant to Rules 161(1) and 162 EPC filed Apr. 29, 2021", 20 pgs.
"International Application Serial No. PCT/US2019/021900, International Preliminary Report on Patentability dated Sep. 24, 2020", 9 pgs.
"International Application Serial No. PCT/US2019/021900, International Search Report dated Jun. 17, 2019", 5 pgs.
"International Application Serial No. PCT/US2019/021900, Written Opinion dated Jun. 17, 2019", 9 pgs.
Sigal, Ari, "Coming Soon—Twilio Frame, UI Components for in-app Chat, Voice, & Video", [Online]. [Accessed Aug. 20, 2019]. Retrieved from the Internet: <URL: https://www.twilio.com/blog/2017/05/twillo-frame-coming-soon.html>, (May 25, 2017), 5 pgs.
U.S. Appl. No. 16/351,063, filed Mar. 12, 2019, Customizable Cloud-Based Software Platform.
"Canadian Application Serial No. 3,093,080, Respons filed Jan. 28, 2022 to Office Action dated Sep. 28, 2021", 25 pgs.
"Indian Application Serial No. 202017038353, Response filed Feb. 18, 2022 to First Examination Report dated Sep. 15, 2021", w English claims, 33 pgs.
"Australian Application Serial No. 2019234671, Response filed Jul. 1, 2021 to First Examination Report dated Mar. 29, 2021", 84 pages.
"U.S. Appl. No. 16/351,063, Supplemental Notice of Allowability dated Sep. 9, 2021", 2 pages.
"Indian Application Serial No. 202017038353, First Examination Report dated Sep. 15, 2021", With English translation, 7 pages.
"Canadian Application Serial No. 3,093,080, Office Action dated Sep. 28, 2021", 6 pgs.

\* cited by examiner

CUSTOMIZABLE CLOUD-BASED SOFTWARE PLATFORM

CROSS-REFERENCE TO RELATED APPLICATIONS

This application is a continuation of U.S. patent application Ser. No. 16/351,063, filed Mar. 12, 2019, which application claims the benefit of priority of U.S. Provisional Application No. 62/641,539, filed on Mar. 12, 2018, and U.S. Provisional Application No. 62/746,289, filed on Oct. 16, 2018, all of which are incorporated herein by reference in their entirety.

TECHNICAL FIELD

An embodiment of the present subject matter relates generally to cloud-based software applications and, more specifically, to a customizable cloud-based software platform.

BACKGROUND

Most existing contact centers were built before the internet when voice communication was essentially the only way that businesses communicated with their customers. Communications have transformed rapidly in the past 10 years with a variety of newly adopted communication channels. As such, companies are demanding more and more from their contact center as the pace at which new communication channels are introduces and adopted accelerates further. Currently, companies have limited options available with regard to contact centers. They can either use existing legacy architectures that provide limited options or build in house systems that require a heavy resource investment to build and maintain. These types of in-house system are slow and laborious to update and modify. Accordingly, improvements are needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
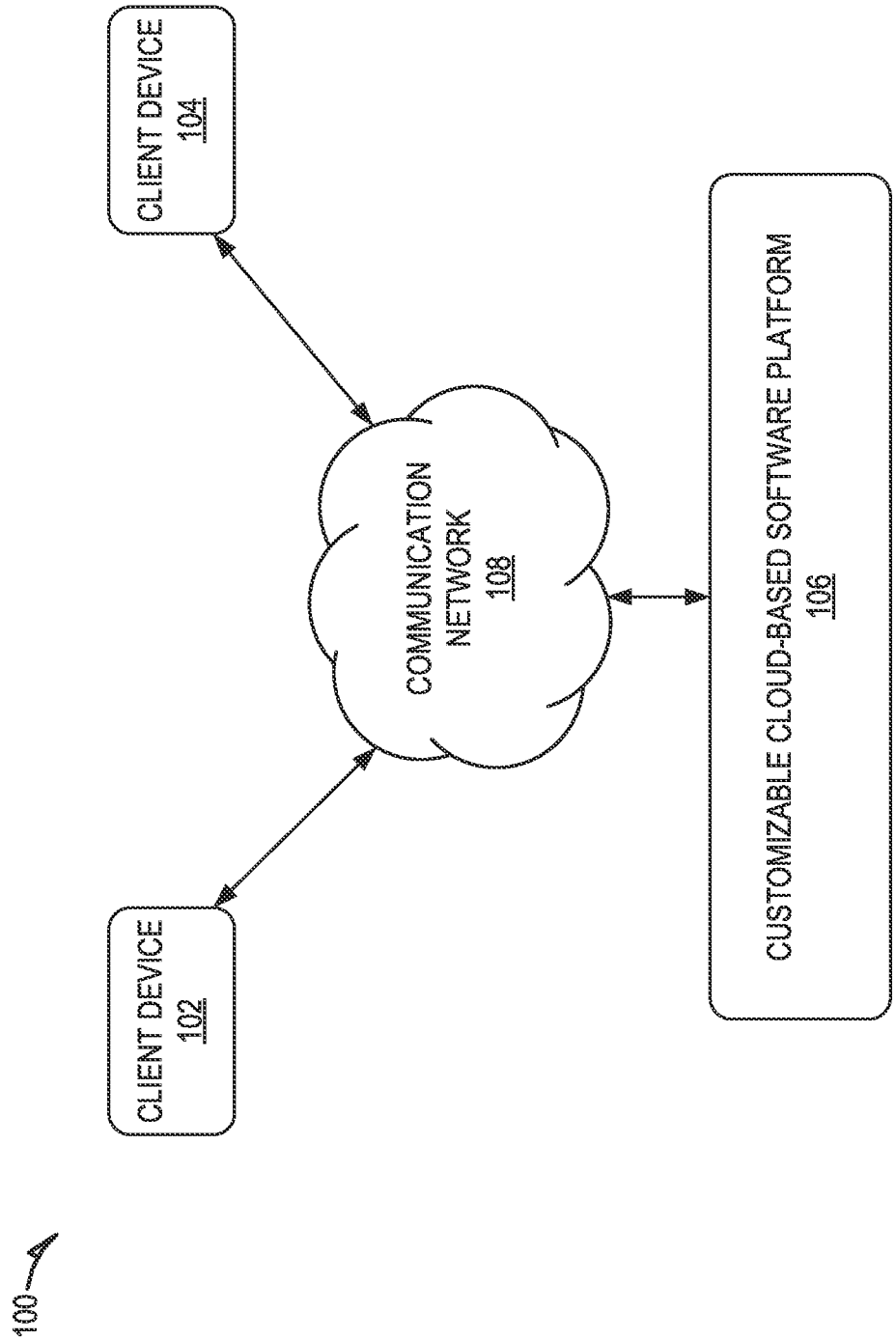
FIG. 1 shows an example system configuration, wherein electronic devices communicate via a network for purposes of exchanging content and other data.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure or characteristic described in connection with the embodiment is included in at least one embodiment of the present subject matter. Thus, the appearances of the phrase "in one embodiment" or "in an embodiment" appearing in various places throughout the specification are not necessarily all referring, to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for a customizable cloud-based software platform. A customizable cloud-based software platform provides functionality that enables a user (e.g., individual user, organization, etc., that has created an account with the customizable cloud-based software platform) to modify a base version of a cloud-based software application to the specific user's needs. For example, the customizable cloud-based software platform provides a base version of a cloud-based software application that includes a base set of functionalities, settings, user interfaces, etc., which a user may modify to meet the user's specific needs. A user may therefore use a client device to interact with the customizable cloud-based software platform to access their customized instance of the cloud-based application.

The cloud-based software application may be any type of cloud-based software, such as those provided by a Software as a Service (SaaS) provider. For example, the cloud-based software application may be a contact center application that enables users to manage a contact center, such as managing various communication channels between customers and agents, presenting notifications and analytics, etc. A communication channel is a form of communication between two or more devices, such as a voice (e.g., phone, VOIP), text, messaging, etc.

The customizable cloud-based software platform provides a user with a base version of the cloud-based software application that the user may modify to the user's specific needs. For example, the cloud-based software application provides a base set of functionality that the user may modify by adding functionality, removing functionality and/or modifying existing functionality, The base set of functionality may include presentation of data within a user interface, actions performed by the cloud-based software application, presentation of notifications, etc.

The customizable cloud-based software platform provides a software application framework that enables a user to modify the base version of the cloud-based software application. The software application framework provides details regarding operation of the base version of the cloud-based software application as well as instructions of how to modify various aspects of the cloud-based software application. For example, the software application framework provides a set of software libraries or classes used by the base version of the cloud-based software application, as well as specifications for generating modifications to the various functionality of the cloud-based software application.

The customizable cloud-based software platform provides various modification development models for modifying the cloud-based software application. For example, the customizable cloud-based software platform may simply provide users with source code for the base version of the cloud-based software application, which user may modify as desired. As another example, the customizable cloud-based software platform may provide a user with user interface component model wherein a user is provided with a user interface component tree defining the various user interface components of the base version of the cloud-based software application. A user may modify the base version of the cloud-based software application by adding new user interface components to the user interface component tree, modifying existing user interface components of the user interface component tree, removing user interface components from the user interface component tree, etc.

In another example, the customizable cloud-based software platform provides a reusable software data package model that enables users to generate and implement reusable software packages to modify the source code of the base version of the cloud-based software application. A reusable software package is a reusable piece of software that modifies an existing software application (e.g., a software plugin). For example, the reusable software package may add a feature to the base version of the cloud-based software application. One advantage of reusable software packages is that it may be reused as often as desired by simply adding a reference to the reusable software data package to the source code for the base version of the cloud-based software application. Accordingly, multiple users may share the reusable software packages that they develop.

The customizable cloud-based software platform generates a customized instance of the cloud-based software program for a user based on the base version of the cloud-based software application and the set of modifications provided by the user using any of the above described methods. For example, in response to a user using their client device to login to their user account with the customizable cloud-based software platform, the customizable cloud-based software platform generates the customized instance of the cloud-based software program based on the set of modifications for the user account and the base version of the cloud-based software program. The customizable cloud-based software platform provides the requesting user access to the customized instance of the cloud-based software program. For example, the customizable cloud-based software platform provides the user's client device access to utilize and/or control the functionality of the customized instance of the cloud-based software application that is being executed by the customizable cloud-based software platform.

The customizable cloud-based software platform is a multi-tenant system, meaning that customizable cloud-based software platform maintains multiple user accounts. Accordingly, the customizable cloud-based software platform provides different customized instances of the cloud-based software application to each user account based on the set of modifications for the respective user account. This is advantageous as each user may generate a customized instance of the cloud-based software application based on their specific needs without having to develop the software from scratch and/or maintaining the on-premises equipment needed to implement the software. In contrast, current SaaS systems are not customizable software platforms.

In some embodiments, the customizable cloud-based software platform may provide security measures against modifications that could cause errors or otherwise compromise the functionality of the cloud-based software application. For example, the customizable cloud-based software platform may limit modifications to specified portions of the base version of the cloud-based software application and/or limit the types of modifications that can be implemented. The customizable cloud-based software platform may provide a listing of the available portions of the base version of the cloud-based software application that may be modified by a user. This may include instructions, source code, etc., for use in modifying the desired portion of the base version of the cloud-based software application.

FIG. 1 shows an example system configuration 100, wherein electronic devices communicate via a network for purposes of exchanging content and other data. As shown, multiple devices (i.e., client device 102, client device 104, and customizable cloud-based software platform 106) are connected to a communication network 108 and configured to communicate with each other through use of the communication network 108. The communication network 108 is any type of network, including a local area network ("LAN"), such as an intranet, a wide area network ("WAN"), such as the internet, or any combination thereof. Further, the communication network 108 may be a public network, a private network, or a combination thereof. The communication network 108 is implemented using any number of communications links associated with one or more service providers, including one or more wired communication links, one or more wireless communication links, or any combination thereof, Additionally, the communication network 108 is configured to support the transmission of data formatted using any number of protocols.

Multiple computing devices can be connected to the communication network 108. A computing device is any type of general computing device capable of network communication with other computing devices. For example, a computing device can be a personal computing device such as a desktop or workstation, a business server, or a portable computing device, such as a laptop, smart phone, or a tablet PC. A computing device can include some or all of the features, components, and peripherals of the machine 1000 shown in FIG. 10.

To facilitate communication with other computing devices, a computing device includes a communication interface configured to receive a communication, such as a request, data, etc., from another computing device in network communication with the computing device and pass the communication along to an appropriate component, module, etc., running on the computing device. The communication interface also sends communications to other computing devices in network communication with the computing device.

In the system 100, users interact with the customizable cloud-based software platform 106 to utilize the functionality provided by the customizable cloud-based software platform 106. For example, users use the client devices 102 and 104 that are connected to the communication network 108 by direct and/or indirect communication to communicate with and utilize the functionality of the customizable cloud-based software platform 106.

Although the shown system 100 includes only two client devices 102, 104, this is for ease of explanation and is not meant to be limiting. One skilled in the art would appreciate that the system 100 can include any number of client devices 102, 104. Further the customizable cloud-based software platform 106 may concurrently accept connections from and interact with any number of client devices 102, 104. The customizable cloud-based software platform 106 supports connections from a variety of different types of client devices 102, 104, such as desktop computers; mobile computers; mobile communications devices, e.g. mobile phones, smart phones, tablets; smart televisions; set-top boxes; and/or any other network enabled computing devices. Hence, the client devices 102 and 104 may be of varying type, capabilities, operating systems, etc. Further, although the customizable cloud-based software platform 106 is shown in a cloud-based architecture, this is only one example. The functionality of the customizable cloud-based software platform 106 may also be deployed in an on-premises type environment.

A user interacts with the customizable cloud-based software platform 106 via a client-side application installed on the client devices 102 and 104. In some embodiments, the client-side application includes a customizable cloud-based software platform 106 specific component. For example, the component may be a stand-alone application, one or more application plug-ins, and/or a browser extension. However, the users may also interact with customizable cloud-based software platform 106 via a third-party application, such as a web browser, that resides on the client devices 102 and 104 and is configured to communicate with the customizable cloud-based software platform 106. In either case, the client-side application presents a user interface (UI) for the user to interact with customizable cloud-based software platform 106. For example, the user interacts with the customizable cloud-based software platform 106 via a client-side application integrated with the file system or via a webpage displayed using a web browser application.

The customizable cloud-based software platform 106 is one or more computing devices configured to provide a cloud-based software application that can be customized by a user of the customizable cloud-based software platform 106 to meet the specific needs of the user. A user of the customizable cloud-based software platform 106 includes individual users, organization, etc., associated with an account and/or subaccount(s) of the customizable cloud-based software platform 106. The customizable cloud-based software platform 106 provides functionality that enables a user (e.g., individual user, organization, etc., that has created an account with the customizable cloud-based software platform) to modify a base version of the cloud-based software application to the specific user's needs. For example, the customizable cloud-based software platform 106 provides a base version of a cloud-based software application that includes a base set of functionalities, settings, user interfaces, etc., which a user may modify to meet the user's specific needs. A user may therefore use a client device 102, 104 to interact with the customizable cloud-based software platform 106 to access a customized instance of the cloud-based application that is generated by the customizable cloud-based software platform 106 based on modification provided by the user.

The cloud-based software application may be any type of cloud-based software, such as those provided by a Software as a Service (SaaS) provider. For example, the cloud-based software application may be a contact center application that enables users to manage a contact center, such as managing various communication channels between customers and agents, presenting notifications and analytics associated with the communications, etc.

The customizable cloud-based software platform 106 provides a user with a base version of the cloud-based software application that the user may modify to the user's specific needs. For example, the cloud-based software application provides a base set of functionality that the user may modify by adding functionality, removing functionality and/or modifying existing functionality. The base set of functionality may include presentation of data within a user interface, actions performed by the cloud-based software application, presentation of notifications, etc.

The customizable cloud-based software platform 106 provides various software application frameworks (e.g., action framework, notification framework, and program able grid framework) that enable the users to modify various aspects of the cloud-based software application. The software application frameworks provide details regarding operation of the base version of the cloud-based software application as well as instructions of how to modify various aspects of the cloud-based software application. For example, the software application framework provides a set of software libraries or classes used by the base version of the cloud-based software application, as well as specifications for generating modifications to the various functionality of the cloud-based software application.

The customizable cloud-based software platform 106 provides various modification development models for modifying the cloud-based software application. For example, the customizable cloud-based software platform 106 may simply provide users with source code for the base version of the cloud-based software application, which user may modify as desired. As another example, the customizable cloud-based software platform 106 may provide a user with user interface component model where a user is provided with a user interface component tree defining the various user interface components of the base version of the cloud-based software application. A user may modify the base version of the cloud-based software application by adding new user interface components to the user interface component tree, modifying existing user interface components of the user interface component tree, removing user interface components from the user interface component tree, etc.

In another example, the customizable cloud-based software platform 106 provides a reusable software data package model that enables users to generate and implement reusable software packages to modify the source code of the base version of the cloud-based software application. A reusable software package is a reusable piece of software that modifies an existing software application (e.g., a software plugin). For example, the reusable software package may add a feature to the base version of the cloud-based software application. One advantage of reusable software packages is that it may be reused as often as desired by simply adding a reference to the reusable software data package to the source code for the base version of the cloud-based software application. Accordingly, multiple users may share the reusable software packages that they develop. For example, users may share the reusable software packages in an online marketplace similar to an app store.

The customizable cloud-based software platform 106 generates a customized instance of the cloud-based software program for a user based on the base version of the cloud-based software application and the set of modifications provided by the user using the above described methods. For example, in response to a user using their client device 102, 104 to login to their user account with the customizable cloud-based software platform 106, the customizable cloud-based. software platform 106 generates the customized instance of the cloud-based software program based on the set of modifications for the user account and the base version of the cloud-based software program. The customizable cloud-based software platform 106 provides the requesting user access to the customized instance of the cloud-based software program. For example, the customizable cloud-based software platform 106 provides the user's client device 102, 104 access to utilize and/or control the functionality of the customized instance of the cloud-based software application that is being executed by the customizable cloud-based software platform 106.

The customizable cloud-based software platform 106 is a multi-tenant system, meaning that the customizable cloud-based software platform 106 maintains and services multiple user accounts. Accordingly, the customizable cloud-based software platform 106 provides different customized instances of the cloud-based software application to each user account based on the set of modifications for the respective user account. This is advantageous as each user may generate a customized instance of the cloud-based software application based on their specific needs without having to develop the software from scratch and/or maintaining the on-premises equipment needed to implement the software. This in contrast to current SaaS systems that do not allow users to customize the software they provide.

In some embodiments, the customizable cloud-based software platform 106 may provide security measures against modifications that could cause errors or otherwise compromise the functionality of the cloud-based software application. For example, the customizable cloud-based software platform 106 may limit modifications to specified portions of the base version of the cloud-based software application and/or limit the types of modifications that can be implemented. The customizable cloud-based software platform 106 may provide a listing of the available portions of the base version of the cloud-based software application that may be modified by a user. This may include instructions, source code, etc., for use in modifying the desired portion of the base version of the cloud-based software application.

In some embodiments, the customizable cloud-based software platform 106 enables a user to create a contact center application that is customized to the specific user's needs. For example, the customizable cloud-based software platform 106 provides a base version of a contact center application (e.g., Twilio FLEX) that includes default functionality, settings, user interface, etc., which a user may modify to meet the user's specific needs. To utilize the functionality of the customizable cloud-based software platform 106, a user uses a client device 102, 104 to communicate with the customizable cloud-based software platform 106 and create a user account with customizable cloud-based software platform 106.

In this type of embodiment, creating a user account with the customizable cloud-based software platform 106 allows the user to generate and access a base version of the contact center application facilitated by the customizable cloud-based software platform 106. The contact center application allows the user to manage a contact center facilitated by the customizable cloud-based software platform 106. For example, the customizable cloud-based software platform 106 enables the user to select the communication channels the user would like to provide to their customers to communicate with the contact center. The customizable cloud-based. software platform 106 also generates and provides the user with contact information that the user may incorporate into their applications to enable their customers to contact the contact center when needed. The contact information may include phone numbers, email addresses, Application Programming Interface (API) commands, etc., that the user may incorporate into their application and/or otherwise provide to their customers to initiate communication with the contact center.

Once implemented, a customer may user the contact information to initiate a communication request requesting to communicate with an agent, representative, bot, etc., of the contact center. Communication requests made by the user using a client device 102, 104 are routed to the customizable cloud-based software platform 106, which facilitates the contact center for the user account. Each communication request includes an identifier identifying the corresponding user account of the customizable cloud-based software platform 106. Accordingly, communication requests received by the customizable cloud-based software platform 106 are routed by the customizable cloud-based software platform 106 to the proper user account.

The contact center application for each created user account allows a user associated with the user account to access a contact center interface that enables the user to manage the functionality of the contact center, such as viewing received communication requests, routing communication requests to available agents, answering communication requests, initiating communication sessions with customers, etc. A user associated with the user account uses a client device 102, 104 to communicate with the customizable cloud-based software platform 106 to access the contact center application by, for example, providing proper login credentials. Each user account may be associated with multiple login credentials for multiple users authorized to access the contact center application for the user account. Furthermore, the functionality of the contact center application provided to an authorized user may vary depending or permission levels of the user. For example, some users may be granted administrator permission levels that enable the user to configure the contact center application, create new accounts within the contact center application, allocate incoming communication requests to contact center agents, etc. Other users, however, may have limited permission levels associated with an agent and thus may only be authorized to accept incoming communication requests to initiate communication sessions with customers. Accordingly, the functionality of the contact center application, including the contact center interface and data presented to each authorized user, may vary based on the permission levels of the authorized user.

In this type of embodiment, the customizable cloud-based software platform 106 allows a user to generate a customized contact center application that is specific to the user's needs. For example, the customizable cloud-based software platform 106 allows the user to customize a variety of aspects of their contact center application, including the communication channels that are included, the layout and functionality of the contact center interface, notifications and/or alerts that are sent, actions performed by the contact center application in response to specified actions, etc. The customizable cloud-based software platform 106 initially provides a user with a base version of contact center application, which the user may modify to customize the contact center application to the user's needs.

The software application frameworks provided in this type of embodiment allow user to modify various functionality of the base version of the contact center application. For example, the cloud-based software application 106 may provide a notification framework, an action framework, and a programmable grid framework that allows a user to customize various functionality of the cloud-based contact center application. The notification framework allows a user to customize the notification functionality of the cloud-based contact center application, such as customizing the content of alerts and notification, scheduling of notifications, triggers for alerts and notifications, recipients of notifications, etc. The programmable grid framework allows a user to customize the base version of the user interface of the cloud-based contact center application. That is, the programmable grid framework allows a user to modify user interface components presented on the contact center interface, such as changing the positioning and/or size of the user interface components. The programmable grid framework also allows a user to add new user interface components for inclusion in the user interface. The action framework allows a user to customize the actions that are performed by base version of cloud-based contact center application. For example, the action framework allows a user to select the actions performed by the cloud-based contact center application in response to certain triggers, such as receiving a communication request from a customer, an agent selecting an initiate communication session button, etc.

Each of the described frameworks (e.g., notification framework, programmable grid framework, and action framework) may provide a user with a set of software libraries or classes used by the base version of the cloud-based software application, as well as specifications for generating modifications to the various functionality of the cloud-based software application. Additionally, each framework may allow for customization of the source code of the cloud-based software application to implement desired changes. This includes modifying the source code manually as well as utilizing the software plugin model described above.

Figure 2:
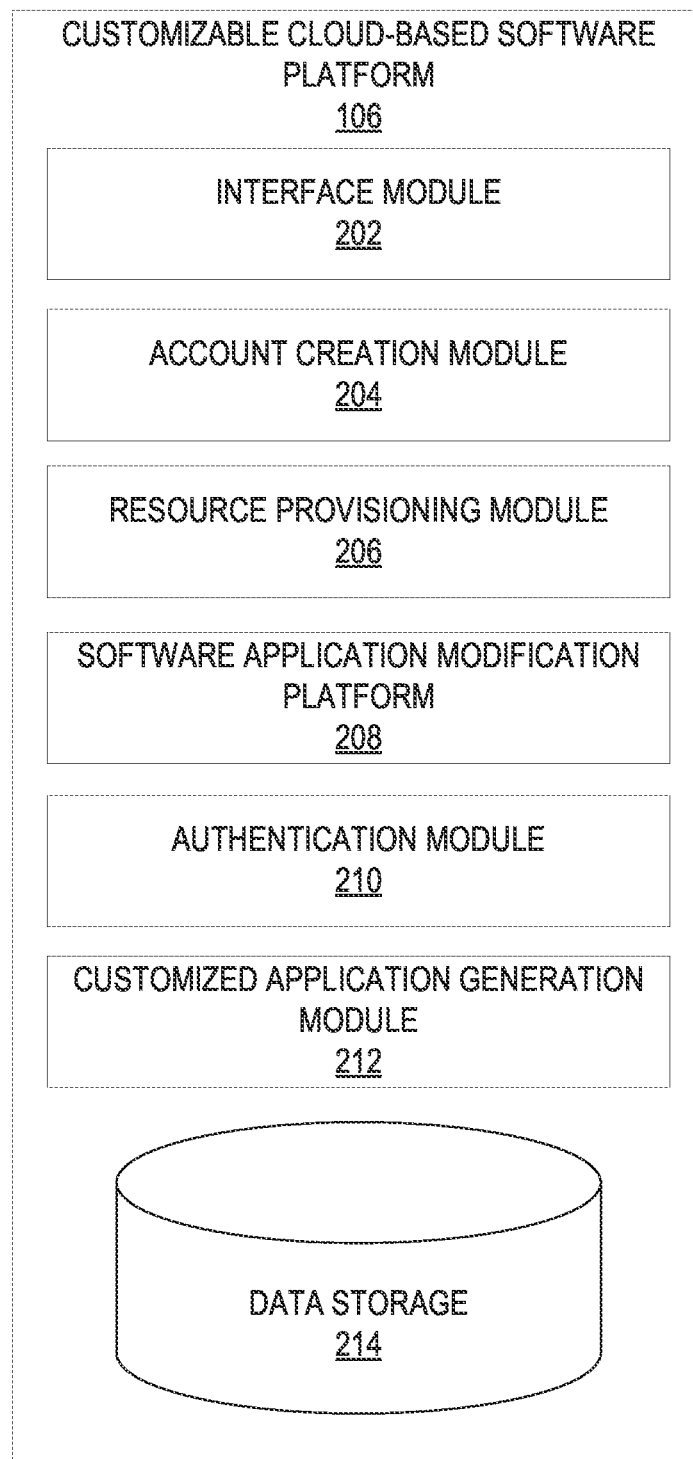
FIG. 2 is a block diagram of a customizable cloud-based software platform, according to some example embodiments.

FIG. 2 is a block diagram of a customizable cloud-based software platform 106, according to some example embodiments. To avoid obscuring the inventive subject matter with unnecessary detail, various functional components (e.g., components) that are not germane to conveying an understanding of the inventive subject matter have been omitted from FIG. 2. However, a skilled artisan will readily recognize that various additional functional components may be supported by the customizable cloud-based software platform 106 to facilitate additional functionality that is not specifically described herein. Furthermore, the various functional components depicted in FIG. 2 may reside on a single computing device or may be distributed across several computing devices in various arrangements such as those used in cloud-based architectures.

As shown, the customizable cloud-based software platform 106 includes an interface module 202, an account creation module 204, a resource provisioning module 206, a software application modification platform 208, an authentication module 210, a customized application generation module 212, and a data storage 214.

The interface module 202 provides a user interface for utilizing the functionality of the customizable cloud-based software platform 106. For example, the interface module 202 provides data to a user's client device 102, 104, that is used by the client device 102. 104 to cause presentation of the user interface on a display of the client device 102, 104. The user interface may present data, such as text, images, etc., to a user. The user interface may also include user interface elements (e.g., buttons, text boxes, links, etc.) that the user may use to utilize the functionality provided by the customizable cloud-based software platform 106. Input and/or data provided by the user using the user interface elements is returned to the interface module 202 to update presentation of the user interface (e.g., the interface module 202 returns updated data to the client device 102, 104 based on the received input and/or data).

The account creation module 204 enable a user to create an account with the customizable cloud-based software platform 106. Creating the user account may include selecting login credentials for the user account and/or subaccounts, setting permission levels, selecting default configurations, etc. The account creation module 202 uses the provided information to generate a user account in the data storage 214. The user account includes the provided information, such as the user credentials, permission levels, etc.

The resource provisioning module 206 provisions software and hardware resources for the newly created user account. For example, in embodiments in which the cloud-based software application is a cloud-based contact center, the software provisioning module 206 generates and configures the contact center for the user account based on the configuration settings provided by the user during the account creation process. This includes allocating resources to facilitate selected communication channels, number of agents, etc., as well as allocating contact information (e.g., phone numbers) to communicate with the generated contact center. The resource provisioning module 206 provides the generated contact information to the account creation module 202, which makes them available to the user account for inclusion in an application or to be otherwise provided to customers.

The cloud-based software application that is initially allocated to a user account is a base version of the cloud-based software application. The base version of the software application includes a base set of functionality, such as a base version of the user interface, a base version of actions performed by the cloud-based software application, a base version of notifications, etc. The software application modification platform 208 allows a user to customize the base version of the cloud-based software application to meet the specific needs of the user. For example, the software application modification platform 208 allows a user to add, remove, and/or modify the functionality provided by the base version of the cloud-based software application.

The software application modification platform 208 provides a software application framework that enables a user to modify the base version of the cloud-based software application. The software application framework provides details regarding operation of the base version of the cloud-based software application as well as instructions of how to modify various aspects of the cloud-based software application. For example, the software application framework provides a set of software libraries or classes used by the base version of the cloud-based software application, as well as specifications for generating modifications to the various functionality of the cloud-based software application.

The software application modification platform 208 provides various modification development models for modifying the cloud-based software application. For example, the software application modification platform 208 may simply provide users with source code for the base version of the cloud-based. software application, which a user may modify as desired. As another example, the software application modification platform 208 may provide a user with user interface component model wherein a user is provided with a user interface component tree defining the various user interface components of the base version of the cloud-based software application. A user may modify the base version of the cloud-based software application by adding new user interface components to the user interface component tree, modifying existing user interface components of the user interface component tree, removing user interface components from the user interface component tree, etc.

In another example, the software application modification platform 208 provides a reusable software data package model that enables users to generate and implement reusable software packages to modify the source code of the base version of the cloud-based software application. A reusable software package is a reusable piece of software that modifies an existing software application (e.g., a software plugin). For example, the reusable software package may add a feature to the base version of the cloud-based software application. One advantage of reusable software packages is that it may be reused as often as desired by simply adding a reference to the reusable software data package to the source code for the base version of the cloud-based software application. Accordingly, multiple users may share the reusable software packages that they develop.

The software application modification platform 208 stores a set of modifications for a user account in the data storage 214, where they can be accessed to generate customized instances of the cloud-based software application. The functionality of the software application modification platform 208 is discussed in greater detail below in relation to FIG. 3.

The authentication module 210 authenticates requests to access the software application modification platform 208. For example, the authentication module 210 receives authentication requests that include login credentials, such as a user name and password. In response, the authentication module 210 verifies that the user name and password match an existing user account with the software application modification platform 208. The authentication module 210 denies authorization requests in the event that the provided user name and password are not verified. Alternatively, the authentication module 210 authenticates an authorization request in the event that the provided user name and password are verified.

The customized application generation module 212 generates a customized instance of the cloud-based software program for a user based on the base version of the cloud-based software application and the set of modifications associated with the user's account. For example, in response to the authorization module 210 authorizing an authorization request, the customized application generation module 212 gathers the set of modification for the user account from the data storage 214 and generates a customized instance of the cloud-based software program based on the set of modifications for the user account and the base version of the cloud-based software program. The customized application generation module 212 provides the requesting user with access to the customized instance of the cloud-based software program. For example, the customized application generation module 212 provides the user's client device 102, 104 access to utilize and/or control the functionality of the customized instance of the cloud-based software application that is being executed by the customizable cloud-based software platform 106. The functionality of the customized application generation module 212 is explained in greater detail in relation to FIG. 4.

As explained earlier, the customizable cloud-based software platform 106 is a multi-tenant system, meaning that it maintains multiple user accounts. Accordingly, the customized application generation module 212 generates different customized instances of the cloud-based software application for user accounts based on the set of modifications for the respective user accounts. This is advantageous as each user may generate a customized instance of the cloud-based software application based on their specific needs without having to develop the software from scratch and/or maintaining the on-premises equipment needed to implement the software. This in contrast to current SaaS systems that are not customizable platforms.

Figure 3:
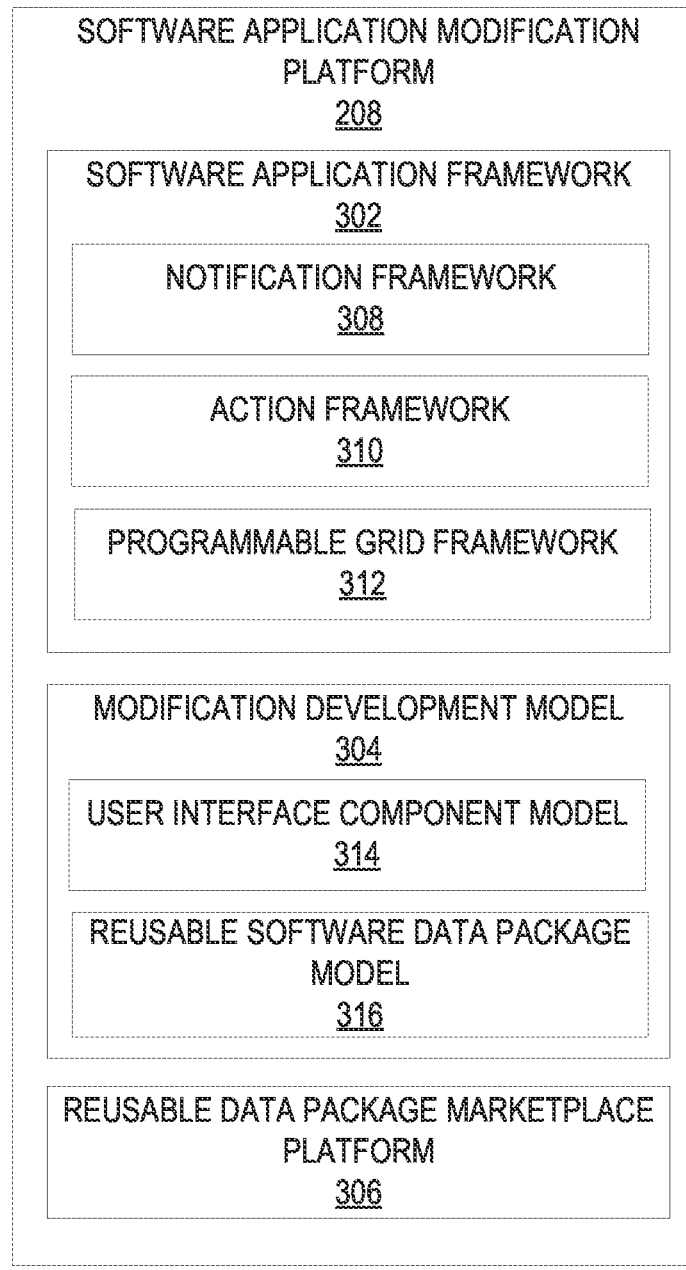
FIG. 3 is a block diagram of a software application modification platform, according to some example embodiments.

FIG. 3 is a block diagram of a software application modification platform 208, according to some example embodiments. To avoid obscuring the inventive subject matter with unnecessary detail, various functional components (e.g., modules) that are not germane to conveying an understanding of the inventive subject matter have been omitted from FIG. 3. However, a skilled artisan will readily recognize that various additional functional components may be supported by the software application modification platform 208 to facilitate additional functionality that is not specifically described herein. Furthermore, the various functional components depicted in FIG. 3 may reside on a single computing device or may be distributed across several computing devices in various arrangements such as those used in cloud-based architectures.

As shown, the software application modification platform 208 includes a software application framework 302, a modification development model 304 and a reusable data package marketplace platform 306.

The software application framework 302 provides users with data that enables the users to modify the base version of the cloud-based software application. The software application framework 302 provides details regarding operation of the base version of the cloud-based software application as well as instructions of how to modify various aspects of the cloud-based software application. For example, the software application framework 302 provides a set of software libraries or classes used by the base version of the cloud-based software application, as well as specifications for generating modifications to the various functionality of the cloud-based software application.

The software application framework 302 may include multiple software application frameworks that for different types of functionality of the cloud-based software application. As shown, the software application framework 302 includes a notification framework 308, an action framework 310, and a programmable grid framework 312.

The notification framework 308 provided data describing notification functionality of the cloud-based software application and how to customize the notification functionality. For example, the notification framework 308 provides data describing the notification functionality of the base version of the cloud-based software application, and how the base version can be customized to modify the content of alerts and notifications, scheduling of notifications, triggers for alerts and notifications, recipients that will receive the notifications, etc. Customizing the content of an alert or notification includes customizing the data that is presented within the alert or notification, such as the message, data points, etc. For example, a user may wish to include a specified message describing the type of alert or notification, as well include instructions on actions that the user is to take. Customizing the scheduling of notifications includes customizing scheduled times at which notifications are transmitted. For example, a user may wish to have notifications including specified data to be transmitted on a weekly, daily, hourly, etc., basis. Customizing the triggers for alerts includes defining triggers that cause an alert. For example, the trigger may be a value exceeding or falling below a threshold, such as a number of concurrent calls exceeding a threshold or a wait time exceeding a threshold. As another example, a trigger may be a number of active agents falling below a threshold. Customizing the users that receive the alerts includes defining specific users, sets of users, etc., that receive the notifications or alerts.

The action framework 310 provides data describing action functionality of the cloud-based software application and how to customize the action functionality. For example, the action framework 310 provides data describing the action functionality of the base version of the cloud-based software application, and how the base version can be customized to modify the actions performed by the cloud-based software application in response to certain triggers, such as receiving a communication request from a customer, an agent selecting an initiate communication session button, etc.

The programmable grid framework 312 provides data describing the user interface of the cloud-based software application and how to customize the user interface. For example, the programmable grid framework 312 provides data describing the user interface components of the base version of the cloud-based software application, and how the base version can be customized to modify the user interface components presented in the user interface. For example, programmable grid framework 312 provided data on how to modify the size and/or position of the user interface components, adding new user interface components, removing user interface components, etc.

The modification development model 304 provides tools for generating, testing, and implementing modifications to the cloud-based software application. For example, the modification development model 304 may simply provide users with source code for the base version of the cloud-based software application and a tool to modify the source code as desired. As another example, the modification development model 304 provides a user interface component model 314 that allows a user to implement modification to the user interface component tree of the cloud-based software application. The user interface component tree defines the various user interface components of the base version of the cloud-based software application.

The user interface component model 314 provides a tool to generate modifications to the base version of the cloud-based software application by adding new user interface components to the user interface component tree, modifying existing user interface components of the user interface component tree, removing user interface components from the user interface component tree, etc. The tool provided by the user interface component model 314 may provide a user with access to a user interface component tree for a local instance of the cloud-based software application that can be used to initially implement and test modifications to the user interface component tree. For example, a user may download and execute the tool on their client device 102, 104.

The user may use the tool and the data included in the software application framework 302 to generate and implement modification to the component tree for the local instance of the cloud-based software application. The modification is tested by refreshing the local instance of the cloud-based software application, thereby implementing the modification. The user may then use their client device 102, 104 to test t operation of the modification. Once the user is happy with the resulting modification, the user may use the tool to upload the customizable cloud-based software application where it is used to generate a customized instance of the cloud-based software application for the user.

The modification development model 304 also provides a reusable software data package model 316 that allows a user to implement reusable software data packages to modify the cloud-based software application. A reusable software package is a reusable piece of software that modifies an existing software application (e.g., a software plugin). For example, the reusable software package may add a feature to the base version of the cloud-based software application.

The modification development model 304 provides a tool to generate reusable data packages to modify the base version of the cloud-based software application. The tool provided by the modification development model 304 may provide a user with a local instance of the cloud-based software application that can be used to initially implement and test the functionality of the reusable software data packages. For example, a user may download and execute the tool on their client device 102, 104.

The user may use the tool and the data included in the software application framework 302 to generate reusable software data packages to implement modification to the cloud-based software application. The user may then implement the reusable software data packages into the local instance of the cloud-based software application and test operation of the modification. Once the user is happy with the resulting modification, the user may use the tool to upload the reusable software data package to the customizable cloud-based software platform 106. where it is used to generate a customized instance of the cloud-based software application for the user.

One advantage of reusable software packages is that it may be reused as often as desired by simply adding a reference to the reusable software data package to the source code for the base version of the cloud-based software application. Accordingly, multiple users may share the reusable software packages that they develop. The reusable data package marketplace platform 306 provides an online marketplace where uses may share reusable data packages. For example, users may post the reusable data packages they develop to be shared freely or for a fee with other users.

Figure 4:
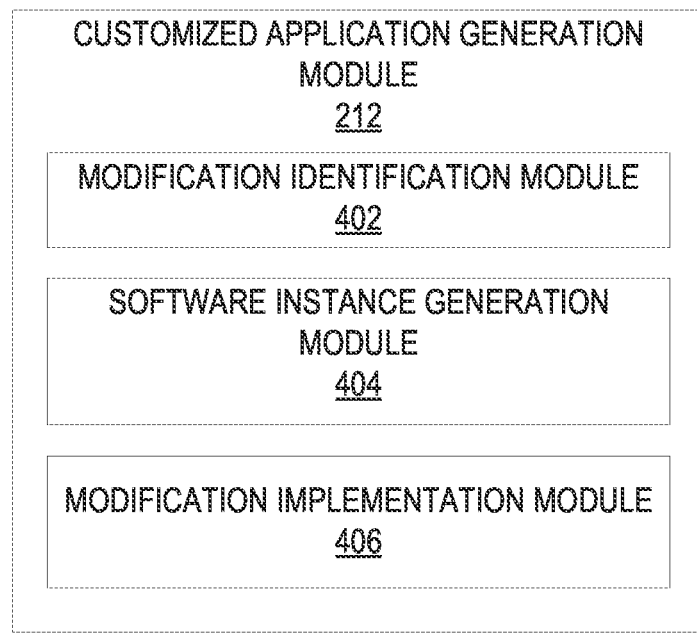
FIG. 4 is a block diagram of a customized application generation module, according to some example embodiments.

FIG. 4 is a block diagram of a customized application generation module 212, according to some example embodiments. To avoid Obscuring the inventive subject matter with unnecessary detail, various functional components (e.g., modules) that are not germane to conveying an understanding of the inventive subject matter have been omitted from FIG. 4. However, a skilled artisan will readily recognize that various additional functional components may be supported by the customized application generation module 212 to facilitate additional functionality that is not specifically described herein. Furthermore, the various functional components depicted in FIG. 4 may reside on a single computing device or may be distributed across several computing devices in various arrangements such as those used in cloud-based architectures.

As shown, the customized application generation module 212 includes a modification identification module 402, a software instance generation model 404 and a modification implementation module 406. The modification identification module 402 gathers a set of modifications associate with a user account. The set of software modifications for a user account may be stored in the data storage 214. Accordingly, the modification identification module 402 searches the data storage 214 for the set of modifications associated with a specific user account.

The software instance generation model 404 generates instances of the base version of cloud-based software application and the set of modifications. The modification implementation module 406 implements the instances of the modifications into an instance of the base version of cloud-based software application, resulting in a customized instance of the cloud-based software application.

Figure 5:
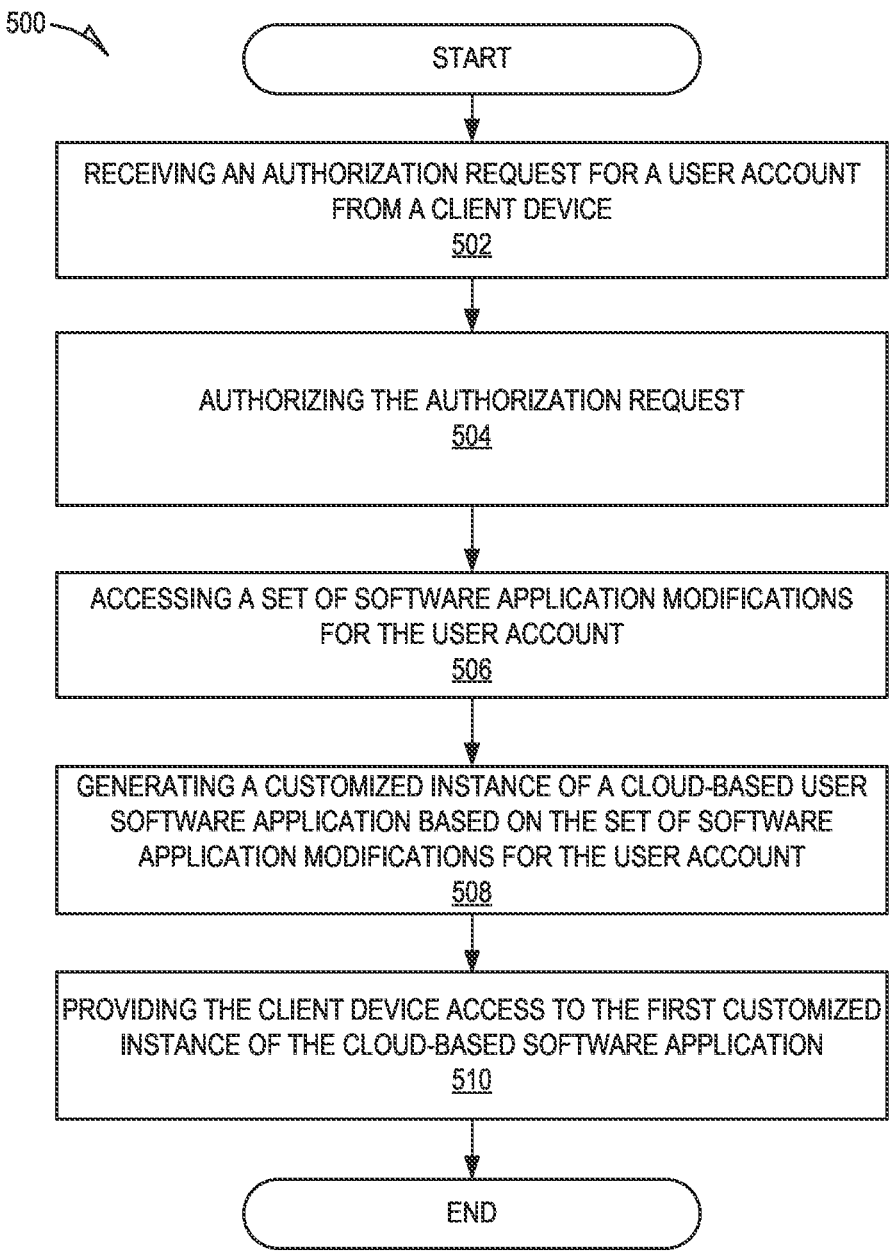
FIG. 5 is a flowchart showing an example method of generating a customized instance of a cloud-based software application, according to certain example embodiments.

FIG. 5 is a flowchart showing an example method 500 of generating a customized instance of a cloud-based software application, according to certain example embodiments. The method 500 may be embodied in computer readable instructions for execution by one or more processors such that the operations of the method 500 may be performed in part or in whole by the customizable cloud-based software platform 106; accordingly, the method 500 is described below by way of example with reference thereto. However, it shall be appreciated that at least some of the operations of the method 500 may be deployed on various other hardware configurations and the method 500 is not intended to be limited to the customizable cloud-based software platform 106.

At operation 502, the authorization module 210 receives an authorization request for a user account from a client device 102. The authorization request includes login credentials, such as a user name and password, to access a user account of the customizable cloud-based software platform.

At operation 504, the authorization module 210 authorizes the authorization request. For example, the authorization module 210 verifies that the provided user name and password match a user name and password associated with the user account.

At operation 506, the customized application generation module 212. accesses a set of software application modifications for the user account. For example, the modification identification module 402 accesses the modifications from the data storage 214.

At operation 508, the modification identification module 402 generates a customized instance of a cloud-based software application based on the set of software application modifications for the user account. For example, the software instance generation model 404 generates an instance of the modifications and an instance of the base version of the cloud-based software application, and the modification implementation module 406 implements the instances of the modifications into the instance of the base version of the cloud-based software application.

At operation 510, the interface module 202 provides the client device 102 access to the first customized instance of the cloud-based software application. For example, the interface module 202 provides the user's client device 102, 104 access to utilize and/or control the functionality of the customized instance of the cloud-based software application that is being executed by the customizable cloud-based software platform 106.

Figure 6:
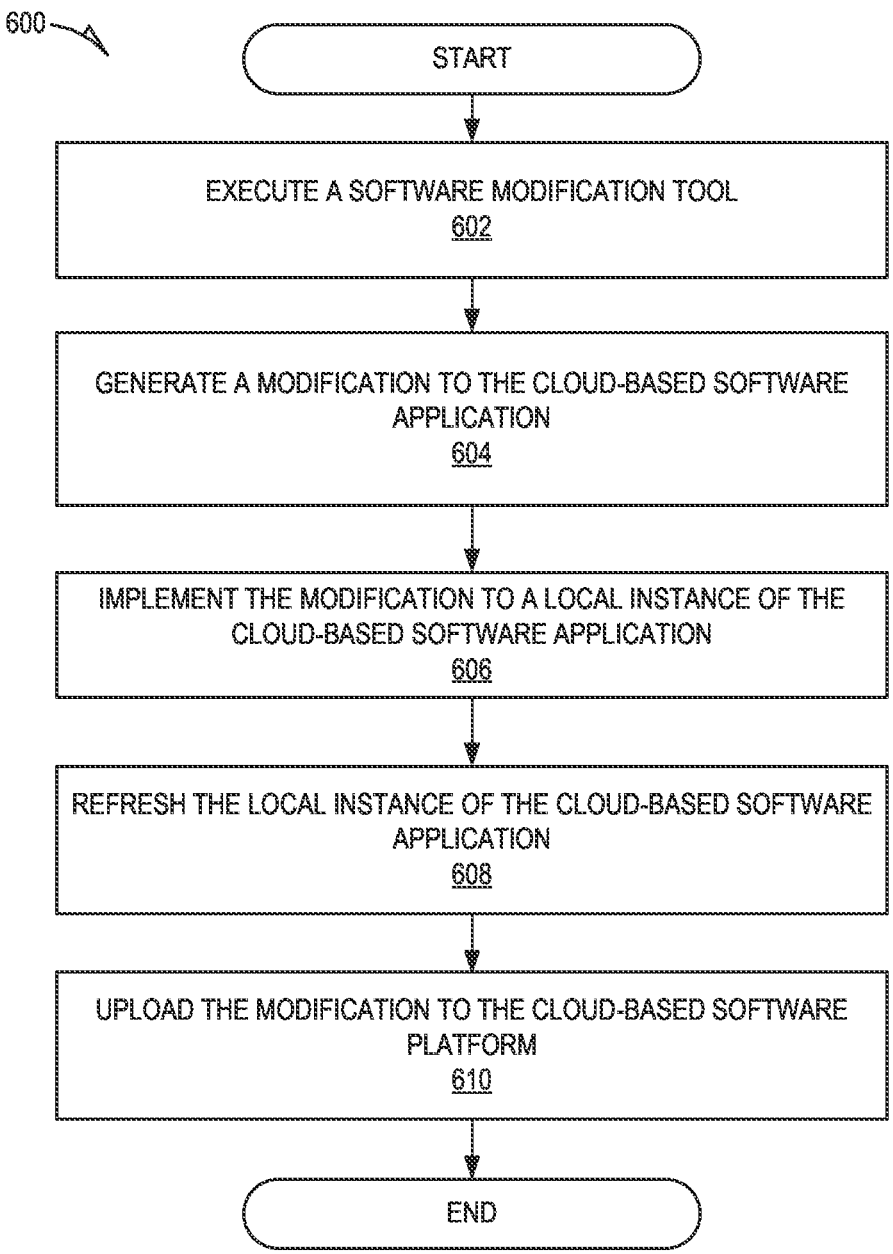
FIG. 6 is a flowchart showing an example method of generating a modification to a cloud-based software application, according to certain example embodiments.

FIG. 6 is a flowchart showing an example method 600 of generating a modification to a cloud-based software application, according to certain example embodiments. The method 600 may be embodied in computer readable instructions for execution by one or more processors such that the operations of the method 600 may be performed in part or in whole by the client device 102; accordingly, the method 600 is described below by way of example with reference thereto. However, it shall be appreciated that at least some of the operations of the method 600 may be deployed on various other hardware configurations and the method 600 is not intended to be limited to the client device 102.

At operation 602, the client device 102 executes a software modification generation tool. The client device 102 may have downloaded the software modification tool from the customizable cloud-based software platform 106. The software modification generation tool enables the client device 102 to execute a local instance of the base version of the cloud-based software application for testing modifications developed by users. The software modification generation tool also enables the user to generate modifications by modifying the component tree and/or implementing a reusable software package.

At operation 604, the client device 102 generates a modification to the cloud-based software application. For example, a user of the client device 102 uses the software modification generation tool to provide code defining the modification.

At operation 606, the client device 102 implements the modification to a local instance of the cloud-based software application. For example, the software modification generation tool generates an instance of the modification, which is implemented into the local instance of the base version of the cloud-based software application.

At operation 608, the client device 102 refreshes the local instance of the cloud-based software application. This causes a customized local instance of the cloud-based software application to execute on the client device. The local instance of the cloud-based software application includes the functionality of the base version of the cloud-based software application modified based on the modification. A user may then test the modification to ensure that it is performing as desired. The user may repeat this process of generating and implementing modifications until the user is satisfied with performance of the resulting modification.

At operation 610, the client device 102 uploads the modification to the cloud-based software platform 106 to be implemented into the customized instance of the cloud-based software application for the user account.

Figure 7:
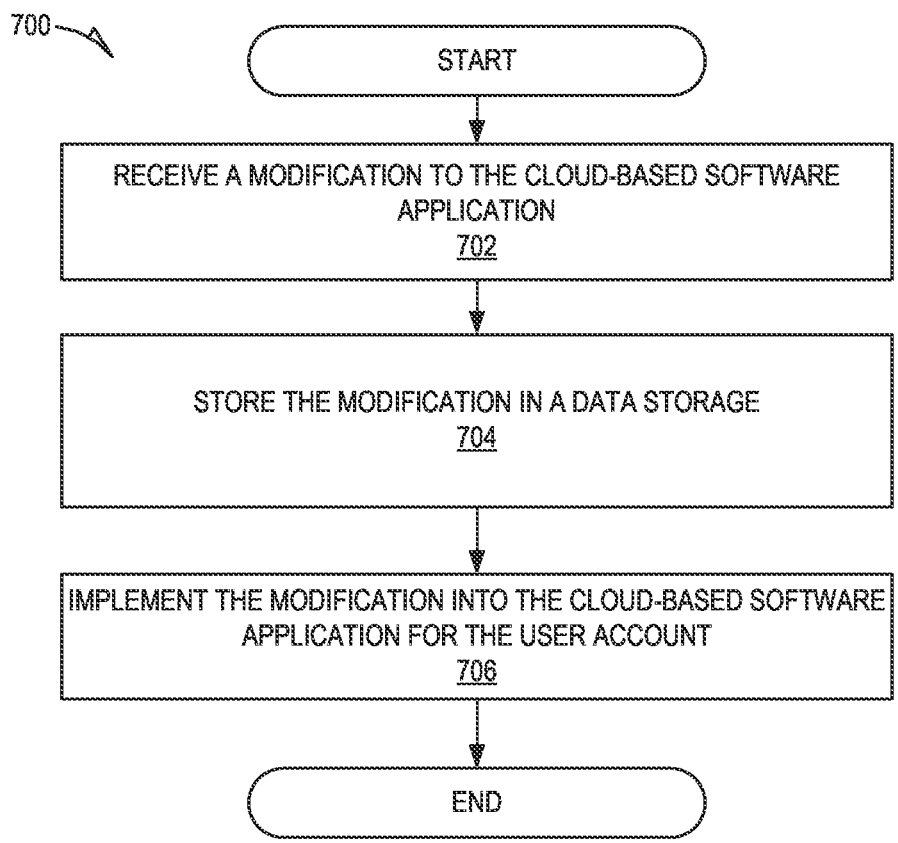
FIG. 7 is a flowchart showing an example method of implementing a modification to a cloud-based software application, according to certain example embodiments.

FIG. 7 is a flowchart showing an example method 700 of implementing a modification to a cloud-based software application, according to certain example embodiments. The method 700 may be embodied in computer readable instructions for execution by one or more processors such that the operations of the method 700 may be performed in part or in whole by the customizable cloud-based software platform 106 accordingly, the method 700 is described below by way of example with reference thereto. However, it shall be appreciated that at least some of the operations of the method 700 may be deployed on various other hardware configurations and the method 700 is not intended to be limited to the customizable cloud-based software platform 106.

At operation 702, the customizable cloud-based software platform 106 receives a modification to the cloud-based software application from a client device 102. The modification may have been developed by a user software modification generation tool executing on the client device 102.

At operation 704, the customizable cloud-based software platform 106 stores the modification to the cloud-based software application in a data storage 214. The modification may be associated with the corresponding user account, At operation 706, the software application modification platform 208 implements the modification into the cloud-based software application for the user account. For example, the software instance generation model 404 generates an instance of the modification and the modification implementation module 406 implements the instance of the modifications into the instance of the cloud-based software application for the user account.

Figure 8:
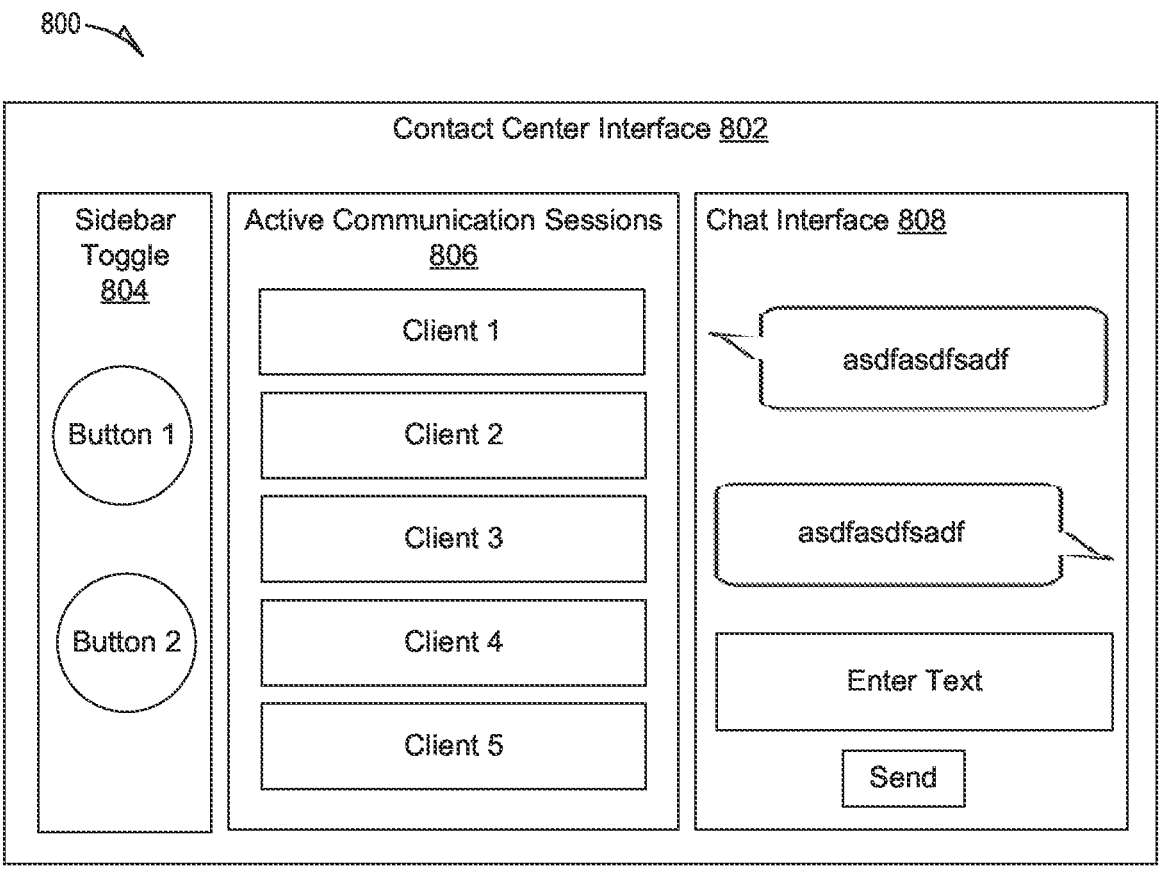
FIG. 8 shows an example of a user interface of the cloud-based software application, according to some example embodiments.

FIG. 8 shows an example of a user interface 800 of the cloud-based software application, according to some example embodiments. As show, the user interface 800 is a contact center interface 802 that provides users with the ability to manage their contact center. The contact center interface includes a sidebar toggle section 804, an active communication sessions section 806 and a chat interface 808. The sidebar toggle section 804 allows users to toggle through various interfaces of the user interface 800. For example, a user may select button 1 to access a first user interface view, such as the functionality shown in the presented view of the contact center interface 802, and select button 2 to view a different set of functionality.

The active communication sessions section 806 presents a list of the active communication sessions assigned to an user, such as a contact center agent. Each active communication session is associated with a different client. An user may select from the listed communication sessions (e.g., client 1, client 2, etc.) to engage in the communication session with the client and/or to cause presentation of data associated with the communication session.

The chat interface 808 enables a user to engage in a chat communication session with a client. As shown, the chat interface 808 presents the messages entered diming the chat communication session and enables a user to enter and send new messages. The chat communication session presented in the chat interface 808 may vary based on the active communication session selected from the active communication sessions section 806, For example, selection of the action communication session for Client 1 from the active communication sessions section 806 causes the corresponding chat communication session to he presented in the chat interface 808. As another example, selection of the action communication session for Client 2 from the active communication sessions section 806 causes the corresponding chat communication session to be presented in the chat interface 808.

The components presented in the user interface 800, as well as the notification and action functionality is modifiable by a user using the described functionality of the customizable cloud-based software platform.

Software Architecture

Figure 9:
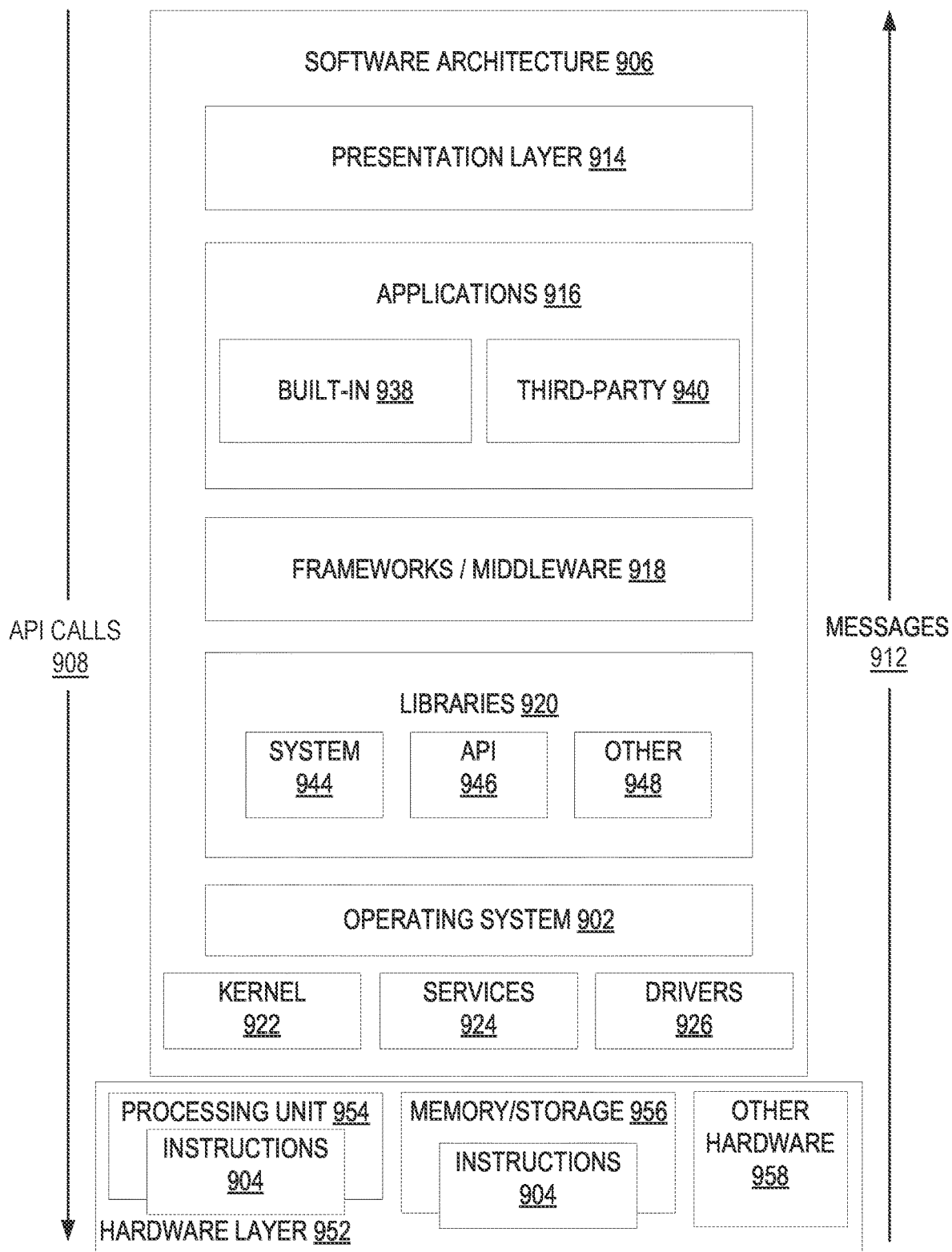
FIG. 9 is a block diagram illustrating a representative software architecture, which may be used in conjunction with various hardware architectures herein described.

FIG. 9 is a block diagram illustrating an example software architecture 906, which may be used in conjunction with various hardware architectures herein described. FIG. 9 is a non-limiting example of a software architecture 906 and it will be appreciated that many other architectures may be implemented to facilitate the functionality described herein. The software architecture 906 may execute on hardware such as machine 1000 of FIG. 10 that includes, among other things, processors 1004, memory 1014, and (input/output) I/O components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906. including implementation of the methods, components, and so forth described herein. The hardware layer 952 also includes memory and/or storage modules memory/storage 956, which also have executable instructions 904. The hardware layer 952, may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke API calls 908 through the software stack and receive a response such as messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924 and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like, The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphic user interface (GUI) functions, high-level resource management, high-level location services, and so forth, The frameworks/middleware 918 may provide a broad spectrum of other APIs that may be used by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built in operating system functions (e.g., kernel 922, services 924 and/or drivers 926), libraries 920, and frameworks/middleware 918 to create user interfaces to interact with users of the system. Alternatively, or additionally, in some systems, interactions with a user may occur through a presentation layer, such as presentation layer 914. in these systems, the application/component 'logic' can be separated from the aspects of the application/component that interact with a user.

Figure 10:
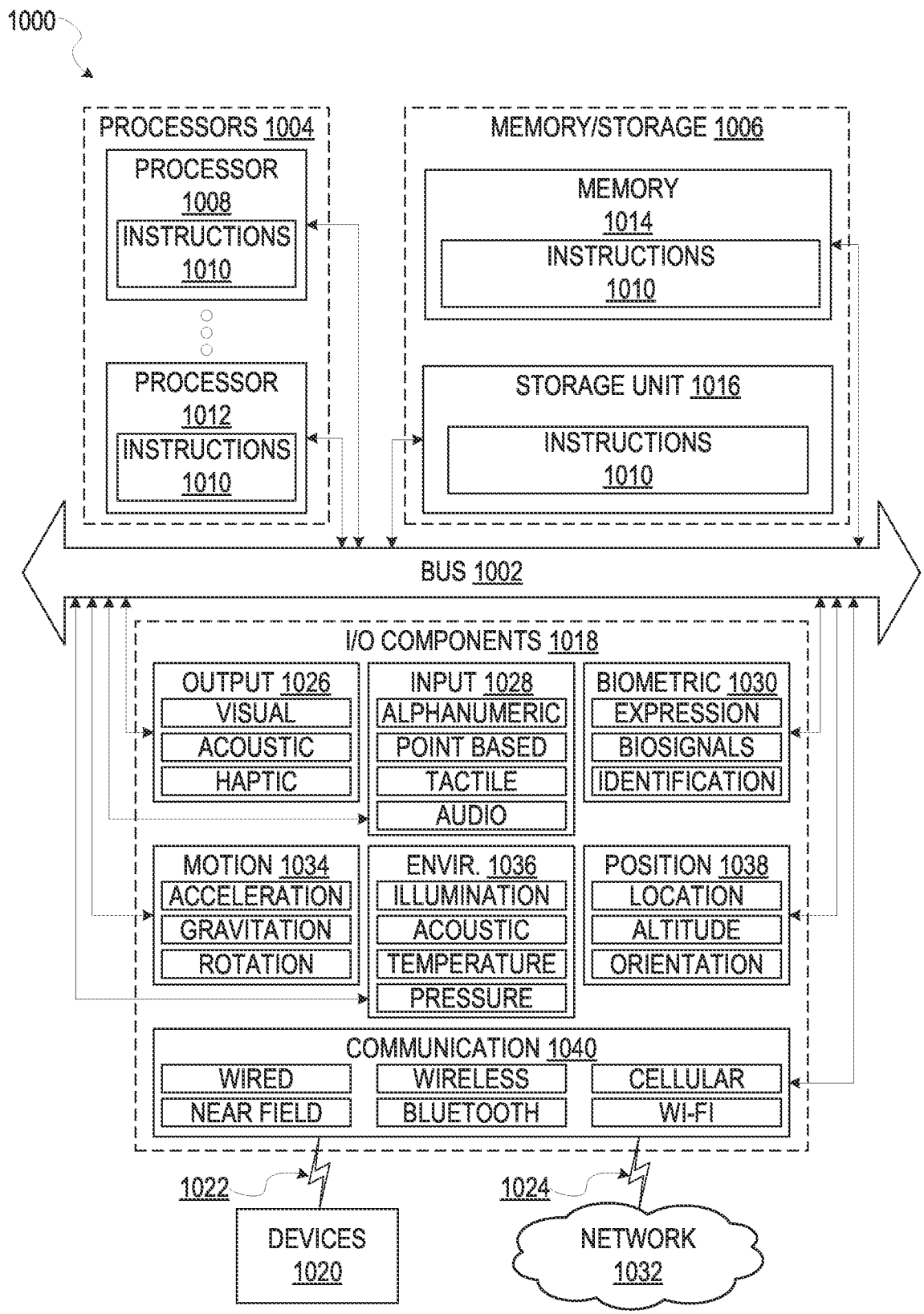
FIG. 10 is a block diagram illustrating components of a machine, according to some example embodiments, able to read instructions from a machine-readable medium (e.g., a machine-readable storage medium) and perform any one or more of the methodologies discussed herein.

FIG. 10 is a block diagram illustrating components of a machine 1000, according to some example embodiments, able to read instructions 904 from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described, In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 1000 capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. The memory/storage 1006 may include a memory 1014, such as a main memory, or other memory storage, and a storage unit 1016, both accessible to the processors 1004 such as via the bus 1002, The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the 110 components 1018 may include biometric components 1030, motion components 1034, environmental components 1036, or position components 1038 among a wide array of other components. For example, the biometric components 1030 may include components to detect expressions (e.g., hand expressions, facial expressions, vocal expressions, body. gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/0 components 1018 may include communication components 1040 operable to couple the machine 1000 to a network 1032 or devices 1020 via coupling 1024 and coupling 1022, respectively. For example, the communication components 1040 may include a network interface component or other suitable device to interface with the network 1032. In further examples, communication components 1040 may include wired communication components, wireless communication components, cellular communication components, near field communication (Ni/C) components, Bluetooth® components (e.g., Bluetooth® Low Energy), Wi-Fi® components, and other communication components to provide communication via other modalities, The devices 1020 may be another machine or any of a wide variety of peripheral devices (e.g., a peripheral device coupled via a USB).

Moreover, the communication components 1040 may detect identifiers or include components operable to detect identifiers. For example, the communication components 1040 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as, location via Internet Protocol (IP) geo-location, location via Wi-Fi® signal triangulation, location via detecting a NEC beacon signal that may indicate a particular location, and so forth.

GLOSSARY

"CARRIER SIGNAL" in this context refers to any intangible medium that is capable of storing, encoding, or carrying instructions 1010 for execution by the machine 1000, and includes digital or analog communications signals or other intangible medium to facilitate communication of such instructions 1010. Instructions 1010 may be transmitted or received over the network 1032 using a transmission medium via a network interface device and using any one of a number of well-known transfer protocols.

"CLIENT DEVICE" in this context refers to any machine 1000 that interfaces to a communications network 1032 to obtain resources from one or more server systems or other client devices. A client device 102, 104 may be, but is not limited to, a mobile phone, desktop computer, laptop, PDAs, smart phones, tablets, ultra books, netbooks, laptops, multi-processor systems, microprocessor-based or programmable consumer electronics, game consoles, STBs, or any other communication device that a user may use to access a network 1032.

"COMMUNICATIONS NETWORK" in this context refers to one or more portions of a network 1032 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 1032 or a portion of a network 1032 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Cartier Radio Transmission Technology (1xRTT), Evolution-Data. Optimized (EVDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 1010 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof, The term "machine-readable medium" should be taken to include a single medium or multiple media (e.g., a centralized or distributed database, or associated caches and servers) able to store instructions 1010. The term "machine-readable medium" shall also be taken to include any medium, or combination of multiple media, that is capable of storing instructions 1010 (e.g., code) for execution by a machine 1000, such that the instructions 1010, when executed by one or more processors 1004 of the machine 1000, cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" refers to "non-transitory" machine-readable mediums and excludes signals or other "transitory" computer readable mediums. A "non-transitory" machine-readable medium is a physical device that can store data for a period of time during which the stored data may be transferrable or reproducible. Examples of a non-transitory machine-readable medium are a physical memory device, Random Access Memory (RAM), etc. In contrast, transitory machine-readable mediums are not physical and store data only momentarily, such as a signal.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and. a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 1004) may be configured by software (e.g., an application 916 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 1004 or other programmable processor 1004. Once configured by such software, hardware components become specific machines 1000 (or specific components of a machine 1000) uniquely tailored to perform the configured functions and are no longer general-purpose processors 1004. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 1004 configured by software to become a special-purpose processor, the general-purpose processor 1004 may be configured as respectively different special-purpose processors (e.g., comprising different hardware components) at different times. Software accordingly configures a particular processor or processors 1004, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 1002) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 1004 that are temporarily configured (e.g., by software) or permanently configured to perform the relevant operations. Whether temporarily or permanently configured, such processors 1004 may constitute processor-implemented components that operate to perform one or more operations or functions described herein. As used herein, "processor-implemented component" refers to a hardware component implemented using one or more processors 1004. Similarly, the methods described herein may be at least partially processor-implemented, with a particular processor or processors 1004 being an example of hardware. For example, at least some of the operations of a method may be performed by one or more processors 1004 or processor-implemented components. Moreover, the one or more processors 1004 may also operate to support performance of the relevant operations in a "cloud computing" environment or as a "software as a service" (SaaS). For example, at least some of the operations may be performed by a group of computers (as examples of machines 1000 including processors 1004), with these operations being accessible via a network 1032 (e.g., the Internet) and via one or more appropriate interfaces (e.g., an API). The performance of certain of the operations may be distributed among the processors 1004, not only residing within a single machine 1000, but deployed across a number of machines 1000. In some example embodiments, the processors 1004 or processor-implemented components may be located in a single geographic location (e.g., within a home environment, an office environment, or a server farm). In other example embodiments, the processors 1004 or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine 1000. A processor 1004 may be, for example, a central processing unit (CPU), a reduced instruction set computing (RISC) processor, a complex instruction set computing (CNC) processor, a graphics processing unit (GPU), a digital signal processor (DSP), an ASIC, a radio-frequency integrated circuit (RFIC) or any combination thereof. A processor may further be a multi-core processor having two or more independent processors 1004 (sometimes referred to as "cores") that may execute instructions 1010 contemporaneously.

What is claimed is:

1. A method comprising:
generating a modified version of a contact center application allocated to an account associated with a contact center platform, wherein generating the modified version of the content center application comprises:
identifying a reusable software package associated with the contact center application, the reusable software package including a modification of the contact center application;
executing the reusable software package along with source code of the contact center application instance; and
causing presentation of the modified version of the contact center application on a client device associated with the account.

2. The method of claim 1, wherein the modification is a modification to a user interface provided by the contact center application.

3. The method of claim 2, further comprising:
receiving an incoming communication request directed to a contact identifier associated with the account; and
updating the user interface to include a graphical component representing the incoming communication request, the graphical component generated based at least in part on the reusable software package.

4. The method of claim 1, wherein the reusable software package is identified. based on a modified version of a contact center application instance allocated to the account.

5. The method of claim 1, wherein the reusable software package uses software libraries provided by the contact center platform.

6. The method of claim 1, wherein the modification included in the reusable software package is to a base set of functionality provided by the contact center application.

7. The method of claim 1, wherein the modification is a modification to a set of notifications defined by a base version of the contact center application.

8. The method of claim 7, further comprising:
receiving an incoming communication request directed to a contact identifier associated with the account; and
generating a notification based on the incoming communication request, the notification generated based at least in part on the reusable software package.

9. The method of claim 1, wherein identifying the reusable software package comprises:
identifying an identifier for the reusable software package in source code of a contact center application instance allocated to the account.

10. A contact center platform comprising:
one or more computer processors; and. one or more computer-readable mediums storing instructions that, when executed by the one or more computer processors, cause the contact center platform to perform operations comprising:
generating a modified version of a contact center application allocated to an account associated with the contact center platform, wherein generating the modified version of the content center application comprises:
identifying a reusable software package associated with the contact center application, the reusable software package including a modification of the contact center application;
executing the reusable software package along with source code of the contact center application instance; and
causing presentation of the modified version of the contact center application on a client device associated with the account.

11. The contact center platform of claim 10, wherein the modification is a modification to a user interface provided by the contact center application.

12. The contact center platform of claim 11, the operations further comprising:
receiving an incoming communication request directed to a contact identifier associated with the account; and
updating the user interface to include a graphical component representing the incoming communication request, the graphical component generated based at least in part on the reusable software package.

13. The contact center platform of claim 10, wherein the modification is a modification to a set of notifications defined by a base version of the contact center application.

14. The contact center platform of claim 13, the operations further comprising:
receiving an incoming communication request directed to a contact identifier associated with the account; and
generating a notification based on the incoming communication request, the notification generated based at least in part on the reusable software package.

15. The contact center platform of claim 10, wherein the reusable software package is identified based on a modified version of a contact center application instance allocated to the account.

16. The contact center platform of claim 10, wherein the reusable software package uses software libraries provided by the contact center platform.

17. The contact center platform of claim 10, wherein the modification included in the reusable software package is to a base set of functionality provided by the contact center application.

18. The contact center platform of claim 10, wherein identifying the reusable software package comprises:
identifying an identifier for the reusable software package in source code of a contact center application instance allocated to the account.

19. A non-transitory computer-readable medium storing instructions that, when executed by one or more computer processors of a contact center platform, cause the contact center platform to perform operations comprising:
generating a modified version of a contact center application allocated to an account associated with the contact center platform, wherein generating the modified version of the content center application comprises:
identifying a reusable software package associated with the contact center application, the reusable software package including a modification of the contact center application;
executing the reusable software package along with source code of the contact center application instance; and causing presentation of the modified version of the contact center application on a client device associated with the account.

20. The non-transitory computer-readable medium of claim 19, wherein identifying the reusable software package comprises:
   identifying an identifier for the reusable software package in source code of a contact center application instance allocated to the account.

\* \* \* \* \*